Figure 1:
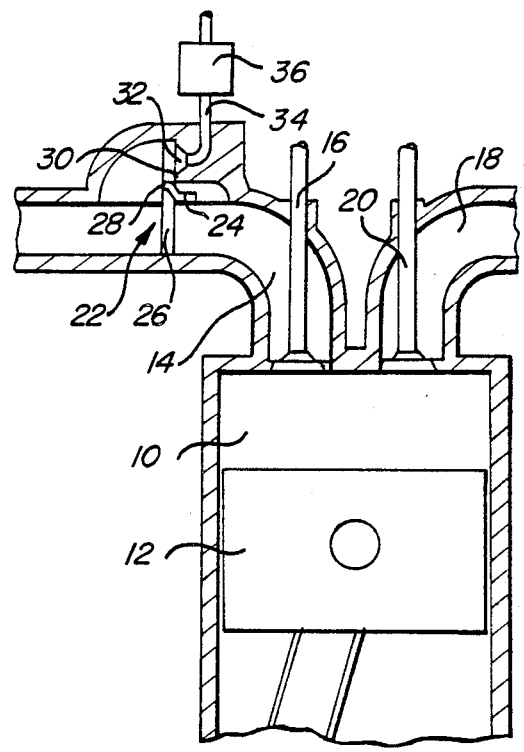

United States Patent [19]

Schatz

[11] Patent Number: 4,981,123
[45] Date of Patent: Jan. 1, 1991

[54] IC ENGINE OF THE PISTON TYPE

[76] Inventor: Oskar Schatz, Waldpromenade 16, 8035 Gauting, Fed. Rep. of Germany

[21] Appl. No.: 267,439
[22] Filed: Nov. 4, 1988
[51] Int. Cl.⁵ .............................................. F02D 9/10
[52] U.S. Cl. .............................. 123/403; 123/52 MF; 123/337
[58] Field of Search .................. 123/52 MF, 337, 403, 123/404, 405, 442

[56] References Cited

U.S. PATENT DOCUMENTS

| | | | |
|---|---|---|---|
| 1,499,599 | 7/1924 | Seppeler et al. | 123/337 |
| 2,228,733 | 1/1941 | Reichhelm et al. | 123/442 X |
| 2,337,982 | 12/1943 | Ericson | 123/52 MF |
| 3,167,059 | 1/1965 | Love | 123/52 MF |
| 3,935,842 | 2/1976 | Ishizawa et al. | 123/52 |
| 4,030,459 | 6/1977 | Hori et al. | 123/52 |
| 4,149,493 | 4/1979 | Franke | 123/26 |
| 4,228,772 | 10/1980 | Bakonyi | 123/403 |
| 4,240,387 | 12/1980 | Motosugi et al. | 123/52 |
| 4,465,034 | 8/1984 | Tsutsumi | 123/306 |
| 4,515,127 | 5/1985 | Katsuoka | 123/430 |
| 4,691,670 | 9/1987 | Bonisch et al. | 123/52 MF |

FOREIGN PATENT DOCUMENTS

| | | |
|---|---|---|
| 3711859 | 10/1987 | Fed. Rep. of Germany . |
| 0147531 | 8/1985 | Japan . |
| 0139929 | 6/1987 | Japan . |

Primary Examiner—Tony M. Argenbright
Attorney, Agent, or Firm—Harness, Dickey & Pierce

[57] ABSTRACT

In the case of an IC engine of the piston type a further valve (22) is placed upstream from the engine inlet valve (16) in the inlet duct (14) and such valve is designed as a directional valve with an adjustable opening threshold, preferably a check flap (26) closing against the direction in inward flow and having an adjustable unsticking force.

11 Claims, 2 Drawing Sheets

U.S. Patent

Jan. 1, 1991

4,981,123

IC ENGINE OF THE PISTON TYPE

The invention relates to an IC engine of the piston type with at least one engine inlet valve placed between an inlet duct and each combustion chamber and a further valve which is placed upstream therefrom in the inlet duct and whose opening time is able to be retarded in relation to the opening of the engine inlet valve.

The further valve, whose opening time may be retarded as required in accordance with certain operational parameters in relation to the opening time of the engine inlet valve means that there is an advantageous effect more especially at low engine speeds of rotation. The engine inlet valve opens while the further valve is still shut. Accordingly expansion firstly takes place of the air in the inlet space between the two valves into the engine cylinder. If the further valve is opened at a correspondingly later point in time vacuum is produced in the engine cylinder. The pressure differential upstream and downstream from this further valve leads, after the opening of the further valve, to a correspondingly high flow velocity of the combustion air then flowing inwards. This flow velocity is slowed down towards the end of the piston stroke so that there is a dynamic in pressure even prior to the end of the closing of the manifold inlet valve. The backflow of charge from the engine cylinder owing to this pressure increase may be precluded by timely closing of the further valve.

A IC engine of this type is described for instance in the EP-A No. 2-0 141 165. In which case the start of opening of the further valve approaches the start of the opening of the engine inlet valve with an increase in the speed of rotation of the engine. In this respect there is more particularly a suggestion of a motor engine drive of the futher valve, more especially by an electromagnetic rotary transmitter. The control or automatic control of the further valve may be controlled or automatically controlled on the basis of the characteristic curves of the motor or by parameters external to the motor as for example the fuel consumption and the amount of contaminants.

The control and automatic control of the further valve involves a certain amount of expense in the case of the known design and may give rise to trouble conditions. Furthermore the closing of the further valve depends on the control or automatic control device, although the only important point is that this further valve should be shut as soon as there are equal pressures on the two sides of the further valve and accordingly the partial return of the charge from the engine cylinder is about to take place.

The object of the invention is to provide an IC engine of the initially described type with such an improvement that the further valve has a simple, low-price and operational reliable design and is able to automatically open and close whatever the additional control and automatic control devices used, there nevertheless being the possibility at the same time of performing an adjustment influencing a retardation of the point of time of opening of the further valve.

In the case of an IC engine of the initially mentioned type this aim is achieved since the further valve is designed in the form of a directional valve with an adjustable opening threshold.

As soon as the previously set opening threshold is reached it is possible for the directional valve to open under the influence of the vacuum obtaining on the engine side. When the pressure on the engine side has so increased that there is a possibility of a return of the charge from the engine cylinder, the directional valve closes of its own accord.

In accordance with a particularly advantageous design the further valve comprises a check valve flap closing against the inflow direction and having an adjustable unsticking force. As a result the opening time of the further valve is determined by the pressure difference across the valve. It would however also be possible for the opening time to be set in relation to the crank angle of the engine, as for instance by a catch which is overcome during closing of the further valve and is able to be shifted into the released position in a way dependent on the engine crank angle, such catch being operated by way of a cam shaft for instance.

In accordance with a convenient design for producing the unsticking force in the closed position the check valve flap covers the opening of a vacuum line in a sealing manner.

This design offers the advantage that the vacuum collapses at once when the check valve flap only moves to a small degree in the opening direction so that the valve also opens briskly without any power requirement as soon as the pressure difference across the check valve flap has exceeded the set opening threshold.

In this respect the vacuum line may comprise a servomember in order to set the vacuum. This servomember may be adjusted in manner dependent on the operational state of the engine and the setting of the accelerator pedal.

In accordance with a further advantageous form of the invention the check valve flap is biased when it is in the closed setting.

The invention will now be described in detail with reference to the drawings.

FIG. 1 diagrammatically shows the inlet and outlet part of a cylinder of an IC engine of the piston type with the further valve designed in accordance with the invention and placed upstream from the engine inlet valve.

Figure 2:
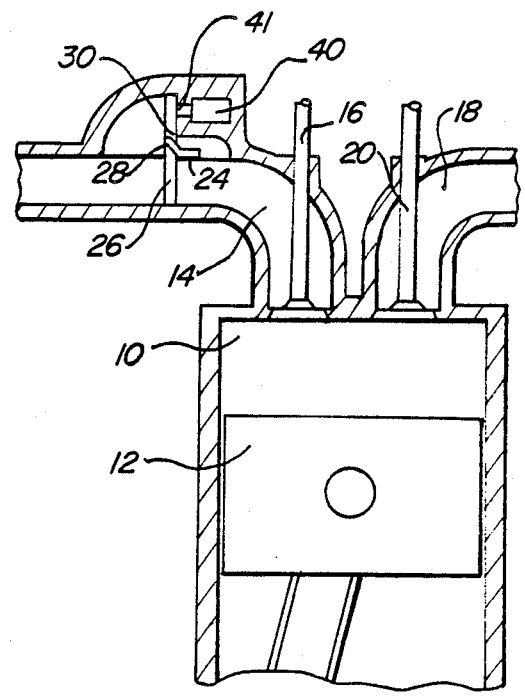

FIG. 2 diagrammatically shows the inlet and outlet part of an IC engine of the piston type with the further valve designed in accordance with another embodiment of the invention and placed upstream from the engine inlet valve.

In the combustion chamber 10 of the engine cylinder shown the piston 12 is arranged so that it may move. The combustion chamber 10 is supplied via an inlet duct 14 with combustion air or combustion air fuel mixture, the combustion chamber 10 being able to be opened and, respectively, closed in relation to the inlet duct 14 by means of an engine inlet valve 16 operated in accordance with the crank angle. The exhaust gases are led off via an outlet duct 18, which is connected via an outlet valve 20 with the combustion chamber.

Upstream from the inlet valve 16 there is a further valve, generally referenced 22, in the inlet duct 14 and the valve member of this valve is in the form of a check flap 26 mounted on a shaft 24 so that it may rotate. The check flap 26 is biased by a torsion spring 28 into its closed setting as shown in the drawing, the force of the sring being selected to be such that it pivots the check flap 26 into the closed setting illustrated as soon as the pressure on the side, turned towards the inlet valve 16, of the valve 22 has more or less reached the pressure which obtains upstream from the valve 22.

In the closed setting the check flap 26 rests on an abutment surface 30 in which the opening 32 of a vacuum line 34 is located. In this respect the arrangement is such that the check flap 26 covers the opening 32 in the closed setting in a sealing manner. The valve 22 is accordingly open when the pressure upstream from the valve 22 is so much greater than the pressure downstream from the valve 22 that the pressure differential is able to overcome the closing force due to the vacuum in the vacuum duct 34 and the torsions spring 28. Once this state has been reached and the check flap 26 has only moved a slight distance in the opening direction, the vacuum collapses and the check flap may be pivoted against the small resistance of the torsion spring 28 into the opening setting.

In order to adjust the unsticking force, there is an adjustment valve 36 in the vacuum line 34 which valve is either fixed at an unsticking force appearing to be desirable or may be variable in accordance with the operational state of the engine and thesetting of the accelerator pedal.

The vacuum duct 34 with its opening 32 is only one of many different ways of producing the retaining force, which has to be overcome by the unsticking force. As shown in FIG. 2, the vacuum system could for instance be replaced by a solenoid 40 which is associated with a catch 41 on the check flap 26, the solenoid 40 is arranged adjacent to the impact surface 30 in place of the opening 32.

Since owing to the valve 22 the inlet duct 14 is always automatically closed at the desired point in time, the closing of the engine inlet valve 16 may be set to optimum conditions at high speeds of rotation, the further valve 22 then automatically taking over the function of improving the torque at low speeds of rotation.

I claim :

1. An IC engine of the piston type with at least one engine inlet valve (16) placed between an inlet duct (14) and each combustion space (10) and a further valve (22), arranged upstream thereof in the inlet duct (14), whose time of opening may be retarded in relation to the opening of the engine inlet valve (16), comprising said further valve being a directional valve closing against the direction of inward flow and pressure differential source means for selectively adjusting a threshold unsticking force, said means for selectively adjusting associated with said directional valve for retaining said directional valve in a closed position and for enabling opening of said directional valve when force of the inward flow overcomes the unsticking force.

2. The IC engine as claimed in claimed 1, characterized in that the further valve (22) is a check flap valve (26).

3. The IC engine as claimed in claim 2, characterized in that the check flap valve is provided with a locking catch which is able to be overcome during closing and is able to be moved into the released state in accordance with the engine crank shaft.

4. The IC engine as claimed in claim 2, characterized in that the check flap valve (26) covers the opening (32) of the pressure differential source means which is a vacuum line (34) in the closed position.

5. The IC engine as claimed in claim 4, characterized in that the vacuum line (34) comprises a servomember (36) in order to set the vacuum.

6. The IC engine as claimed in claim 2, characterized in that the check flap (26) is in engagement with a solenoid in the closed state.

7. The IC engine as claimed in claim 6, characterized in that the force of the solenoid is able to be adjusted.

8. The IC engine as claimed in claim 5, characterized in that the servomember (36) is able to be adjusted in accordance with the operational state of the engine and the position of the accelerator pedal.

9. The IC engine as claimed in any one of the claims 2 through 5, characterized in that the check flap (26) is biased when in the closed position thereof.

10. The IC engine as claimed in claim 1, characterized in that the closing of the egine inlet valve (16) is set to optimum conditions at high speeds of rotation.

11. The IC engine as claimed in claim 3, characterized in that the catch is able to be operated via a cam shaft.

* * * * *

UNITED STATES PATENT AND TRADEMARK OFFICE
CERTIFICATE OF CORRECTION

PATENT NO. : 4,981,123
DATED : Jan. 1, 1991
INVENTOR(S) : Oskar Schatz It is certified that error appears in the above-identified patent and that said Letters Patent is hereby corrected as shown below:

Col. 2, Line 2, after "return" insert --flow--;

Col. 2, Line 36, before "The" insert --An embodiment of--;

Col. 2, Lines 45-46, delete "another embodiment of" after --with--;

Col. 2, Line 64, "sring" should be --spring--;

Col. 3, Line 6, after "accordingly" insert --only--;

Col. 3, Line 20, "thesetting" should be --the setting--;

Col. 3, Lines 24-25, delete "As shown in FIG. 2," before --the--;

Col. 4, Line 38, Claim 10, "egine" should be --engine--.

Signed and Sealed this

Second Day of March, 1993

*Attest:*

STEPHEN G. KUNIN

*Attesting Officer*    *Acting Commissioner of Patents and Trademarks*